No. 838,564. PATENTED DEC. 18, 1906.
J. MURPHY.
ART OF AND APPARATUS FOR THE PREVENTION OF THE ACCUMULATION OF FRAZIL AND ANCHOR ICE IN OR ON WATER POWER APPARATUS.
APPLICATION FILED FEB. 10, 1906.
2 SHEETS—SHEET 2.
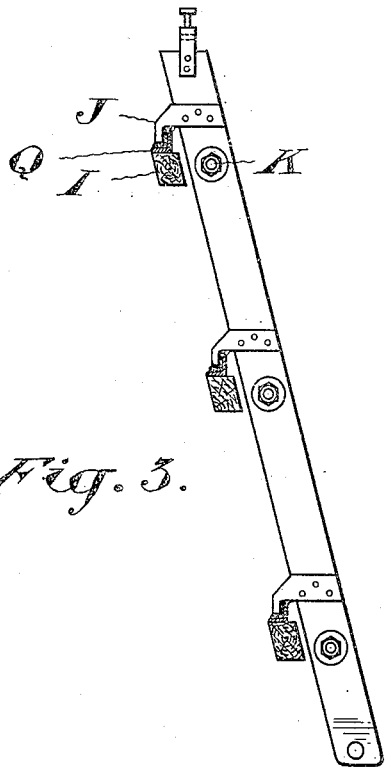
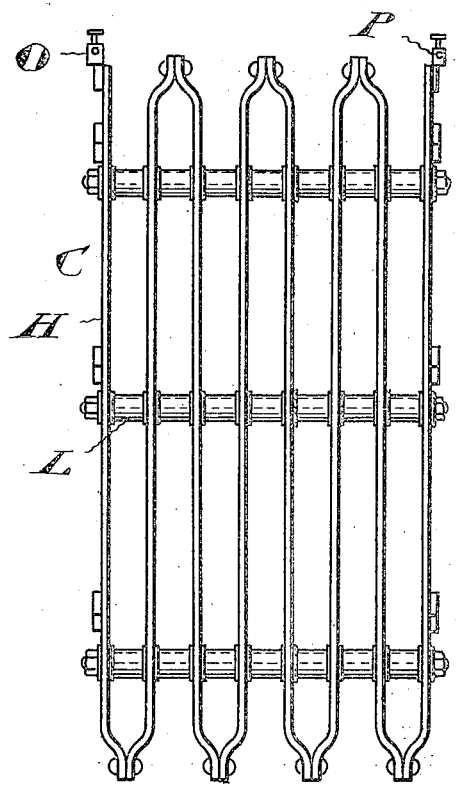
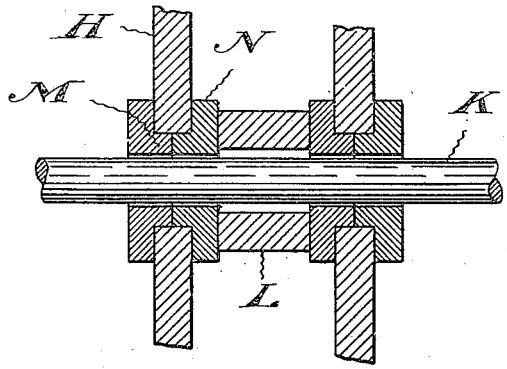
WITNESSES:
INVENTOR.
John Murphy
BY Ridout + Maybee
ATTORNEYS

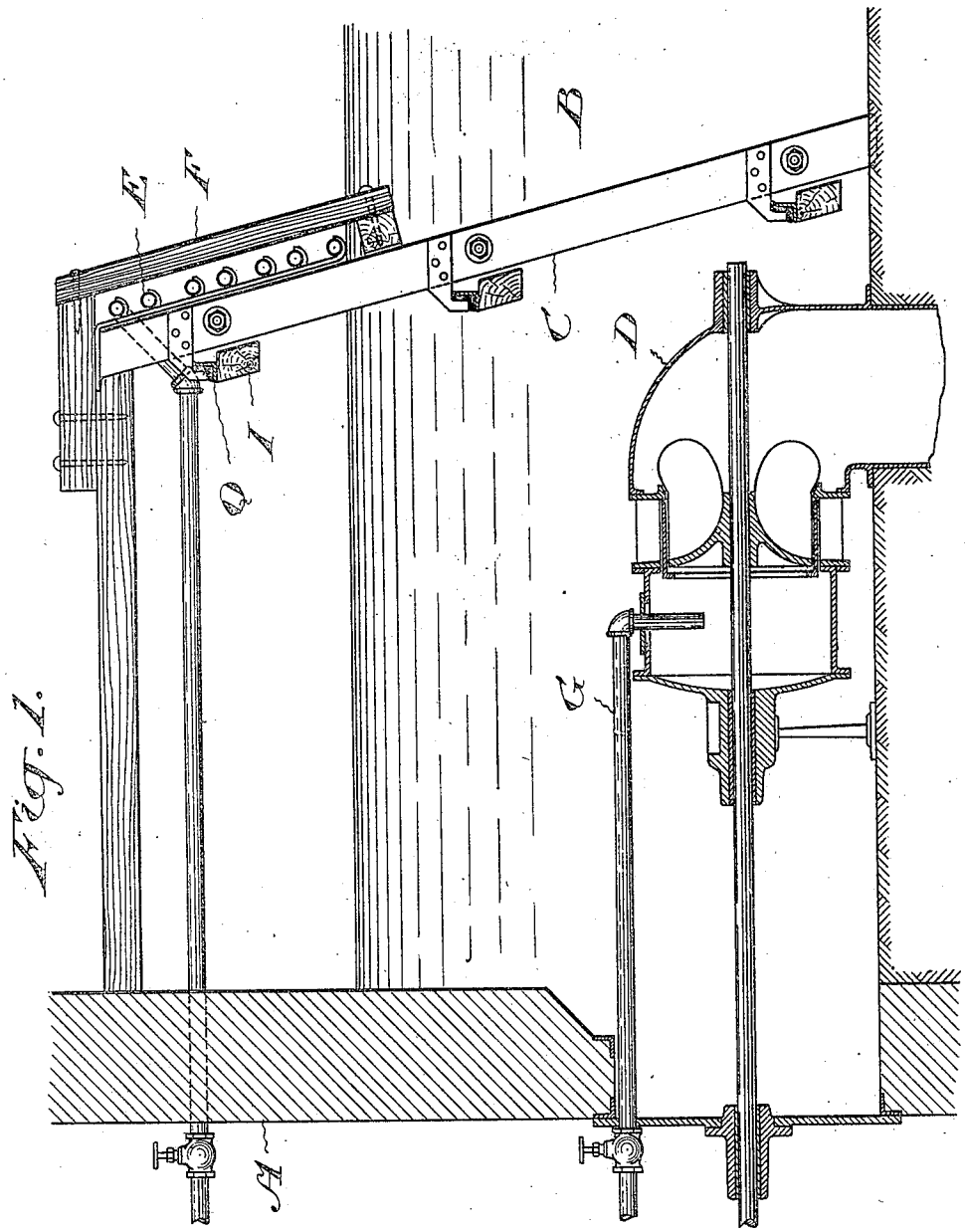

UNITED STATES PATENT OFFICE.

JOHN MURPHY, OF OTTAWA, ONTARIO, CANADA.

ART OF AND APPARATUS FOR THE PREVENTION OF THE ACCUMULATION OF FRAZIL AND ANCHOR ICE IN OR ON WATER-POWER APPARATUS.

No. 838,564.      Specification of Letters Patent.      Patented Dec. 18, 1906.

Application filed February 10, 1906. Serial No. 300,480.

*To all whom it may concern:*

Be it known that I, JOHN MURPHY, of the city of Ottawa, in the Province of Ontario, Canada, have invented certain new and useful Improvements in the Art of and Apparatus for the Prevention of the Accumulation of Frazil and Anchor Ice in or on Water-Power Apparatus, of which the following is a specification.

The object of my invention is to provide means for preventing anchor-ice and frazil or slush ice from adhering to surfaces of water-power apparatus which are exposed to the water, and thus by restricting or closing the openings in said apparatus interfering with the proper operation of the same.

In the operation of hydraulic power plants one of the most serious difficulties met with is the tendency of the apparatus to become covered or filled with icy accumulations, which if allowed to gather for even a short while will entirely block the openings and prevent any water from flowing through, thus causing a stoppage of the water-wheels. These accumulations are due to the presence or the formation in the water of anchor-ice and frazil. Anchor-ice is a species of ice which forms on and adheres to the beds of streams. When this ice is loosened by heat from the sun's rays or other causes, it rises to the top and floats down as a spongy mass, which, though not sticky like frazil, when it comes in contact with the apparatus clogs the passages and stops the flow of the water. Frazil is a form of ice caused by the action of air at a temperature below the freezing-point, extracting heat from the films of water exposed thereto, and by thus lowering the temperature of the same a very small fraction of 1° centigrade below freezing-point converting it into a sticky mass. This undercooling, which results in the formation of frazil, has been determined by scientific observation not to exceed about .006 of 1° below 0° centigrade.

It is found that anchor-ice and frazil will stick to any surface with which they may come into contact under ordinary conditions. I have found that anchor-ice and frazil will not stick to metal surfaces if a sufficient quantity of heat is imparted to these surfaces to maintain them at a temperature of 0° centigrade or slightly over.

My invention consists, therefore, in applying sufficient heat to the metal parts of the apparatus with which the water comes in contact to keep their temperature at or slightly above 0° centigrade. This will prevent the anchor-ice and frazil from sticking to the metal parts, so that the ice will be carried through the apparatus and through the wheel without causing any injurious effects. Heat may be imparted to these parts in many different ways, and I do not desire to restrict myself to any particular means employed.

I illustrate in the drawings the methods of applying heat to the rack-bars of a water-power plant and also to the wheel-casings.

Figure 1 is a vertical diagrammatic section showing a power plant provided with my improvements. Fig. 2 is a front elevation of rack-bars arranged to be heated by electrical energy. Fig. 3 is an end view of the same. Fig. 4 is a sectional detail showing the method of insulating the bars.

In the drawings like letters of reference indicate corresponding parts in the different figures.

The apparatus in general is such as is ordinarily employed and need not be particularly referred to.

A is the power-house wall; B, the water-supply; C, the rack, and D the casing of the water-wheel, located at the bottom of the penstock.

In Fig. 1 I show the rack heated by means of a coil of steam-pipes E, which may be supplied with steam from within the power-house. These pipes are cased in by a wooden facing F, which prevents the radiation of heat to the outer air. These pipes heat the metal bars of the rack C, and thus prevent the sticking of the frazil and anchor ice to the same. Most of the anchor-ice and frazil will thus pass between the rack-bars, and the remainder being loose is easily scraped away by the attendants. I also show a steam-pipe G leading into the dome of the casing of the water-wheel. The dome is thus heated and imparts its heat to the other parts of the casing of the water-wheel, effectually preventing, as I have demonstrated in practice, the accumulation of ice within or about the wheel.

In Figs. 2, 3, and 4 I show means for electrically heating the rack-bars. The rack or screen is composed of thin bars of iron H, which are connected with the supports I by means of hooks J, secured to the outer bars. The bars are connected by bolts K and are spaced by means of suitable separators L. I insulate the bars from the bolts and separators by means of the split bushings M, which are provided with flanges N to engage opposite sides of the bars. In order to form an electric circuit, the ends of the bars are laterally offset, so that the bars may be connected together alternately at opposite ends, as shown in Fig. 2. Connections may be made by welding the ends of the bars together, by riveting them, or in any other suitable manner. The end bars may be provided with the terminals O and P. Thus an electric current may be caused to flow through the entire length of each bar in the rack. The supports I are preferably made of wood, and insulating material is provided between the angle-bars Q, connected with these supports and the hooks J.

I am aware that attempts have been made to heat the water passing through water-power apparatus in order to prevent the accumulation of frazil and anchor ice. Owing to the enormous quantity of water to be heated, such attempts have usually been complete failures. I have found by calculation that in order to heat the whole of the water passing through the power plant at which my experiments were made it would require an expenditure of energy greater than the output of the plant, whereas with my process I found in actual practice that under severe weather conditions it required less than ten per cent. of the total plant-output to maintain the temperature of the rack-bars at such a point that frazil or icy accumulations would not adhere thereto—that is, in a hydro-electric power plant with an output of three-thousand-horse power it required an expenditure of two-hundred-and-forty-horse power of electrical energy through the rack-bars to destroy the effect of frazil or anchor ice thereon. My experiments also show that a twenty-horse-power boiler will generate steam sufficient to effectively keep clear wheels of one-thousand-horse-power capacity.

When it is considered that the energy for supplying heat to the apparatus is consumed only during periods when the weather conditions are such that frazil anchor ice is being formed, and even then not continuously, the quantity consumed for this purpose is negligible in comparison with the loss sustained by the plant becoming shut down completely or by the gates freezing up and becoming unmanageable.

I am aware that steam has been employed to thaw frozen water-power apparatus or remove ice therefrom; but it has never before been demonstrated that water-power apparatus might be rendered free from troubles due to frazil and anchor ice by means of the continuous application of comparatively small quantities of heat applied to the surfaces with which the water comes in contact.

What I claim as my invention is—

1. The art of preventing the accumulation of frazil or anchor ice on water-power apparatus, which consists essentially in directly imparting sufficient heat to the parts of the apparatus in contact with the running water to maintain them at a temperature at or above 32° Fahrenheit, and arranging that so far as possible the heat used escapes to the water only from the parts of the heated apparatus, substantially as described.

2. The art of preventing the accumulation of frazil or anchor ice on water-power apparatus, which consists essentially in directly imparting to the apparatus, and the films of running water immediately in contact therewith, sufficient heat to prevent the undercooling of .006° centigrade, which results in the production of frazil-ice, and arranging that so far as possible the heat used escapes to the water only from the parts of the heated apparatus, substantially as described.

3. In the art of preventing the accumulation of frazil or anchor ice in water-power apparatus the combination with the parts of the apparatus through which running water flows, of means for directly introducing heat units into said parts, the said means being arranged so that as far as possible the heat used escapes to the water only from the parts of the heated apparatus, substantially as described.

4. In the art of preventing the accumulation of frazil or anchor ice on racks or screens, the combination with the rack through which the running water passes; of means for directly introducing heat units into the bars of the rack, the said means being arranged so that as far as possible the heat used escapes to the water only from the parts of the heated apparatus, substantially as described.

5. The combination with a rack or screen through which water passes, of means for introducing electrical energy into the bars of the rack to raise their temperature, substantially as described.

6. A rack or screen composed of bars, between which water is to pass, arranged in electrical contact with each other to form a continuous conductor, substantially as described.

7. A rack or screen composed of bars, between which water is to pass, the bars having their ends electrically connected to form a continuous zigzag electric conductor, substantially as described.

8. The combination of a rack-section composed of bars, insulated separators arranged between the consecutive bars, and means for supplying electrical energy to the bars, substantially as described.

9. The combination of a rack composed of metal bars, and means for preventing the escape of heat from the upper ends of the bars, of means for introducing heat units to the bars, substantially as described.

Ottawa, Ontario, February 7, 1906.

JOHN MURPHY.

In presence of—
 HAROLD FISHER,
 M. M. MURPHY.